US011970971B2

(12) United States Patent
Poornima M et al.

(10) Patent No.: US 11,970,971 B2
(45) Date of Patent: Apr. 30, 2024

(54) HEAT TRANSFER SYSTEM FOR GAS TURBINE ENGINE

(71) Applicants: General Electric Company, Schenectady, NY (US); General Electric Deutschland Holding GmbH, Frankfurt (DE)

(72) Inventors: Rajani Bhanu Poornima M, Bengaluru (IN); Vilas Kawaduji Bokade, Bengaluru (IN); Subramani Adhiachari, Bengaluru (IN); Sesha Subramanian, Bengaluru (IN); Pankaj Sharma, Bengaluru (IN); Ashish Sharma, Munich (DE); Scott Alan Schimmels, Miamisburg, OH (US)

(73) Assignees: General Electric Company, Schenectady, NY (US); General Electric Deutschland Holding GmbH, Lichtenfels (DE)

( * ) Notice: Subject to any disclaimer, the term of this patent is extended or adjusted under 35 U.S.C. 154(b) by 0 days.

(21) Appl. No.: 17/841,876

(22) Filed: Jun. 16, 2022

(65) Prior Publication Data
US 2023/0349324 A1 Nov. 2, 2023

(30) Foreign Application Priority Data
Apr. 27, 2022 (IN) .............................. 202211024723

(51) Int. Cl.
*F02C 7/047* (2006.01)
*F01D 25/08* (2006.01)

(52) U.S. Cl.
CPC .............. *F02C 7/047* (2013.01); *F01D 25/08* (2013.01); *F05D 2220/36* (2013.01); *F05D 2260/20* (2013.01)

(58) Field of Classification Search
CPC ...... F02C 7/047; F01D 25/08; F05D 2220/36; F05D 2260/20
See application file for complete search history.

(56) References Cited

U.S. PATENT DOCUMENTS 7,900,437 B2  3/2011  Venkataramani et al.
8,704,181 B2  4/2014  Thorez et al.
(Continued)

FOREIGN PATENT DOCUMENTS

CN  107745816 A  3/2018
CN  108801020 A  11/2018
(Continued)

Primary Examiner — Grant Moubry
Assistant Examiner — Ruben Picon-Feliciano
(74) Attorney, Agent, or Firm — Dority & Manning, P.A.

(57) ABSTRACT

A turbofan engine is provided. The turbofan engine includes a fan; a turbomachine operably coupled to the fan for driving the fan, wherein the turbomachine, the fan, or both include an engine component; a heat source; and a heat transfer system configured to reduce ice buildup or ice formation in the engine component, the heat transfer system in communication with the heat source, the heat transfer system comprising: a first heat transfer component in communication with the heat source; and a second heat transfer component that extends from the first heat transfer component to or through the engine component, wherein the first heat transfer component comprises one of a heat pipe or a graphene rod, and wherein the second heat transfer component comprises the other of the heat pipe or the graphene rod.

20 Claims, 5 Drawing Sheets

(56) References Cited

U.S. PATENT DOCUMENTS

| | | | |
|---|---|---|---|
| 10,183,754 B1 | 1/2019 | Agarwal et al. | |
| 10,260,419 B2 | 4/2019 | Cerny et al. | |
| 11,034,457 B2 | 6/2021 | Borup et al. | |
| 2008/0053100 A1* | 3/2008 | Venkataramani | F02C 7/14 60/772 |
| 2013/0239542 A1 | 9/2013 | Dasgupta et al. | |
| 2015/0291284 A1* | 10/2015 | Victor | B64D 15/04 244/134 B |
| 2016/0061056 A1* | 3/2016 | Appukuttan | F01D 25/10 415/144 |
| 2017/0314471 A1* | 11/2017 | Sennoun | F28D 15/02 |
| 2019/0233127 A1 | 8/2019 | Carcone et al. | |
| 2019/0257247 A1* | 8/2019 | Pal | F02C 7/18 |

FOREIGN PATENT DOCUMENTS

| | | | | |
|---|---|---|---|---|
| CN | 113184196 A | | 7/2021 | |
| GB | 2602146 A | * | 6/2022 | F02C 7/047 |

* cited by examiner

HEAT TRANSFER SYSTEM FOR GAS TURBINE ENGINE

PRIORITY INFORMATION

The present application claims priority to Indian Provisional Patent Application Number 202211024723 filed on Apr. 27, 2022.

TECHNICAL FIELD

The present subject matter relates generally to a gas turbine engine, or more particularly to a heat transfer system configured to reduce ice buildup or ice formation on components of the engine.

BACKGROUND

A turbofan engine generally includes a fan having a plurality of fan blades and a turbomachine arranged in flow communication with one another. Additionally, the turbomachine of the turbofan engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere. However, during inclement weather, freezing rain, hail, sleet, ice, etc., can accumulate on the inlet components of the turbofan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "vertical", "horizontal", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As discussed above, during inclement weather, freezing rain, hail, sleet, ice, etc., can accumulate on the inlet components of a turbofan engine. When ice accumulates, it can break off and be ingested into the engine. Further, large portions of ice can damage the fan blades or other downstream components of the engine, and may potentially cause an engine flameout.

The present disclosure is generally related to a heat transfer system that is coupled to, or integrated into, a portion of a turbofan engine. The heat transfer system of the present disclosure is configured to reduce ice buildup or ice formation in an engine component of the turbofan engine. The heat transfer system of the present disclosure includes a first heat transfer component in communication with a heat source and a second heat transfer component that extends from the first heat transfer component to or through the engine component. The first heat transfer component includes one of a heat pipe or a graphene rod, and the second heat transfer component includes the other of the heat pipe or the graphene rod.

In exemplary embodiments, the heat source is a gear box of the turbofan engine. In this manner, the heat transfer system of the present disclosure utilizes waste heat from the gear box to reduce ice buildup or ice formation in components of the gas turbine engine.

Different groups of engine components are susceptible to icing at different conditions. Therefore, a control system of the present disclosure utilizes a first type of detected information for a first group of engine components and a second type of detected information for a second group of engine components. In this manner, the systems of the present disclosure allow for proper ice monitoring and detection for each group of engine components. Furthermore, in this manner, the control system of the present disclosure is able to activate the heat transfer system only for the group of engine components that are experiencing a potential icing situation.

Figure 1:
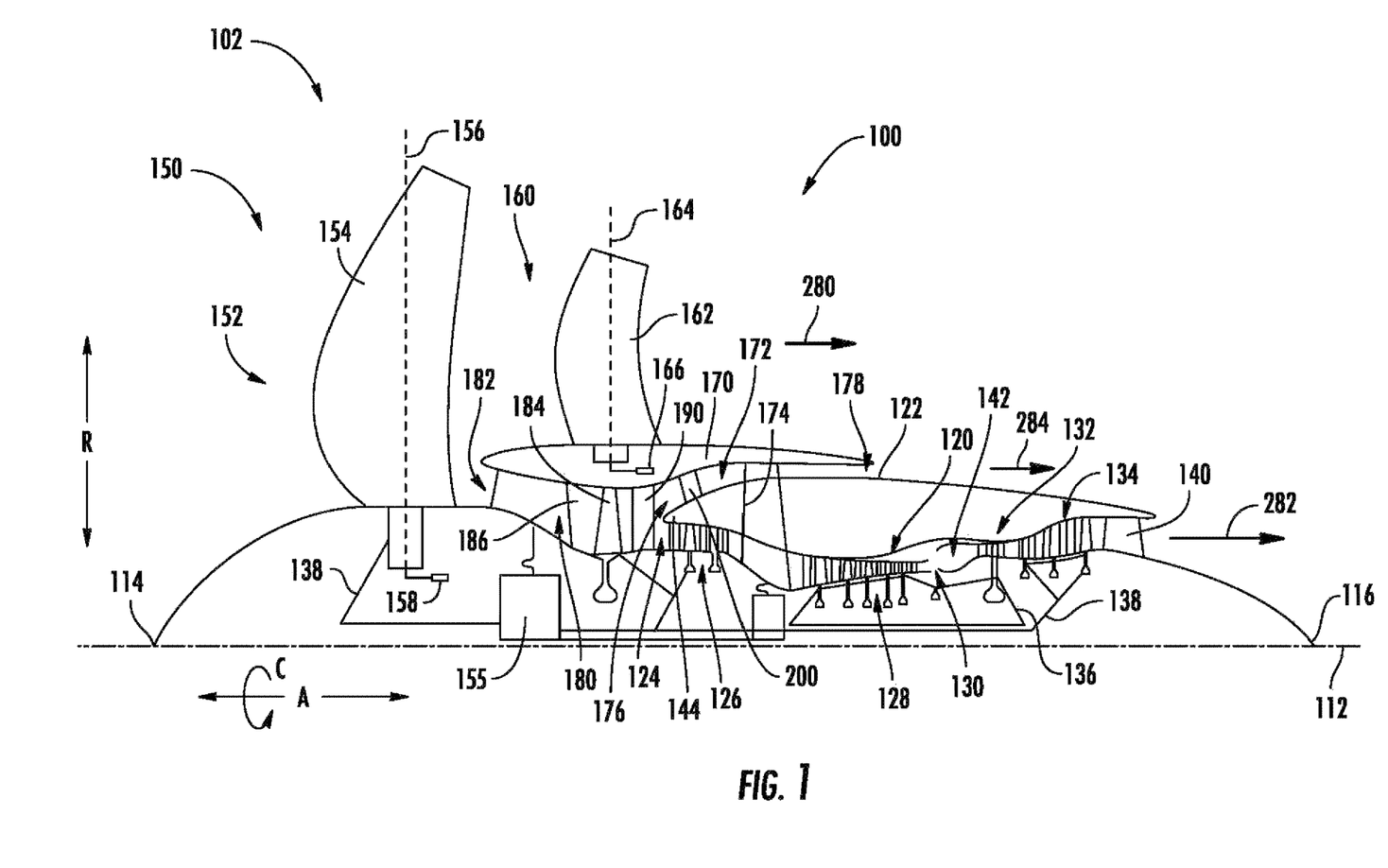
FIG. 1 is a schematic cross-sectional view of an exemplary gas turbine engine according to an exemplary embodiment of the present subject matter.

Referring now to FIG. 1, a schematic cross-sectional view of a gas turbine engine or turbofan engine, referred to herein as an engine 100, is provided according to an example embodiment of the present disclosure. Particularly, FIG. 1 provides an engine having a rotor assembly with a single stage of unducted rotor blades. In such a manner, the rotor assembly may be referred to herein as an "unducted fan," or the entire engine 100 may be referred to as an "unducted engine," or an engine having an open rotor propulsion system 102. In addition, the engine 100 of FIG. 1 includes a mid-fan stream extending from the compressor section to a rotor assembly flowpath over the turbomachine, as will be explained in more detail below. It is also contemplated that, in other exemplary embodiments, the present disclosure is compatible with an engine having a duct around a rotor assembly, also referred to as a fan section. It is also contemplated that, in other exemplary embodiments, the present disclosure is compatible with a turbofan engine having a third stream as described herein.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees(360°) around the longitudinal axis 112. The engine 100 extends between a forward end 114 and an aft end 116, e.g., along the axial direction A.

The engine 100 includes a turbomachine 120, also referred to as a core of the engine 100, and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a core or turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream. As used herein, the term "second stream" or "core stream" refers to a stream that flows through the engine inlet and the ducted fan and also travels through the core inlet and the core duct.

The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blade axis 164, e.g., in unison with one another. One or more actuators 166 are provided to facilitate such rotation and therefore may be used to change a pitch of the fan guide vane 162 about their respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., the HP compressor 128 and combustion section for the embodiment depicted). The ducted fan 184 is shown at about the same axial location as the fan blade 154, and radially inward of the fan blade 154. The ducted fan 184, for the embodiment depicted, is driven by the low pressure turbine 134 (e.g., coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flowpath or fan duct 172. The fan flowpath or fan duct 172 may be referred to as a third stream of the engine 100. As used herein, the term "third stream" or "mid-fan stream" refers to a stream that flows through an engine inlet and a ducted fan but does not travel through a core inlet and a core duct. Furthermore, the third stream is a stream of air that takes inlet air as opposed to free stream air. The third stream goes through at least one stage of the turbomachine, e.g., the ducted fan.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of the third stream thrust. In particular, the engine 100 further includes an array of inlet guide vanes ("IGVs") 186 positioned in the inlet duct 180 upstream of the ducted fan 184 and downstream of the engine inlet 182. The array of inlet guide vanes 186 are arranged around the longitudinal axis 112. For this embodiment, the fan inlet guide vanes 186 are not rotatable about the longitudinal axis 112. Each inlet guide vanes 186 defines a central blade axis (not labeled for clarity), and is rotatable about their respective central blade axes, e.g., in unison with one another. One or more actuators may be provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes ("OGVs") 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 may include one or more actuators for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust during one or more engine operating conditions. Further, by introducing a variability in the geometry of the inlet guide vanes 186 and the fan exhaust nozzle 178, the engine 100 may be capable of generating more efficient third stream thrust across a relatively wide array of engine operating conditions, including takeoff and climb (where a maximum total engine thrust is generally needed) as well as cruise (where a lesser amount of total engine thrust is generally needed).

In exemplary embodiments, air passing through the fan duct 172 may be relatively cooler (e.g., lower temperature) than one or more fluids utilized in the turbomachine 120. In this way, one or more heat exchangers 200 may be disposed within the fan duct 172 and utilized to cool one or more fluids from the turbomachine 120, also referred to as a core of the engine 100, with the air passing through the fan duct 172, as a resource for removing heat from a fluid, e.g., compressor bleed air, oil or fuel.

Although not depicted, in certain exemplary embodiments, the engine 100 may further include one or more heat exchangers 200 in other annular ducts or flowpath of the engine 100, such as in the inlet duct 180, in the turbomachinery flowpath/core duct 142, within the turbine section and/or turbomachine exhaust nozzle 140, etc.

In the exemplary embodiment depicted, a first stream 280 travels outside of the engine inlet 182. As used herein, the term "first stream" or "free stream" refers to a stream that flows outside of the engine inlet and over a fan, which is unducted. Furthermore, the first stream 280 is a stream of air that is free stream air.

Furthermore, a third stream 284 travels through the fan duct 172 and out the fan exhaust nozzle 178. Additionally, a second stream or core stream 282 is also shown along with the first stream 280 and the third stream 284.

Figure 2:
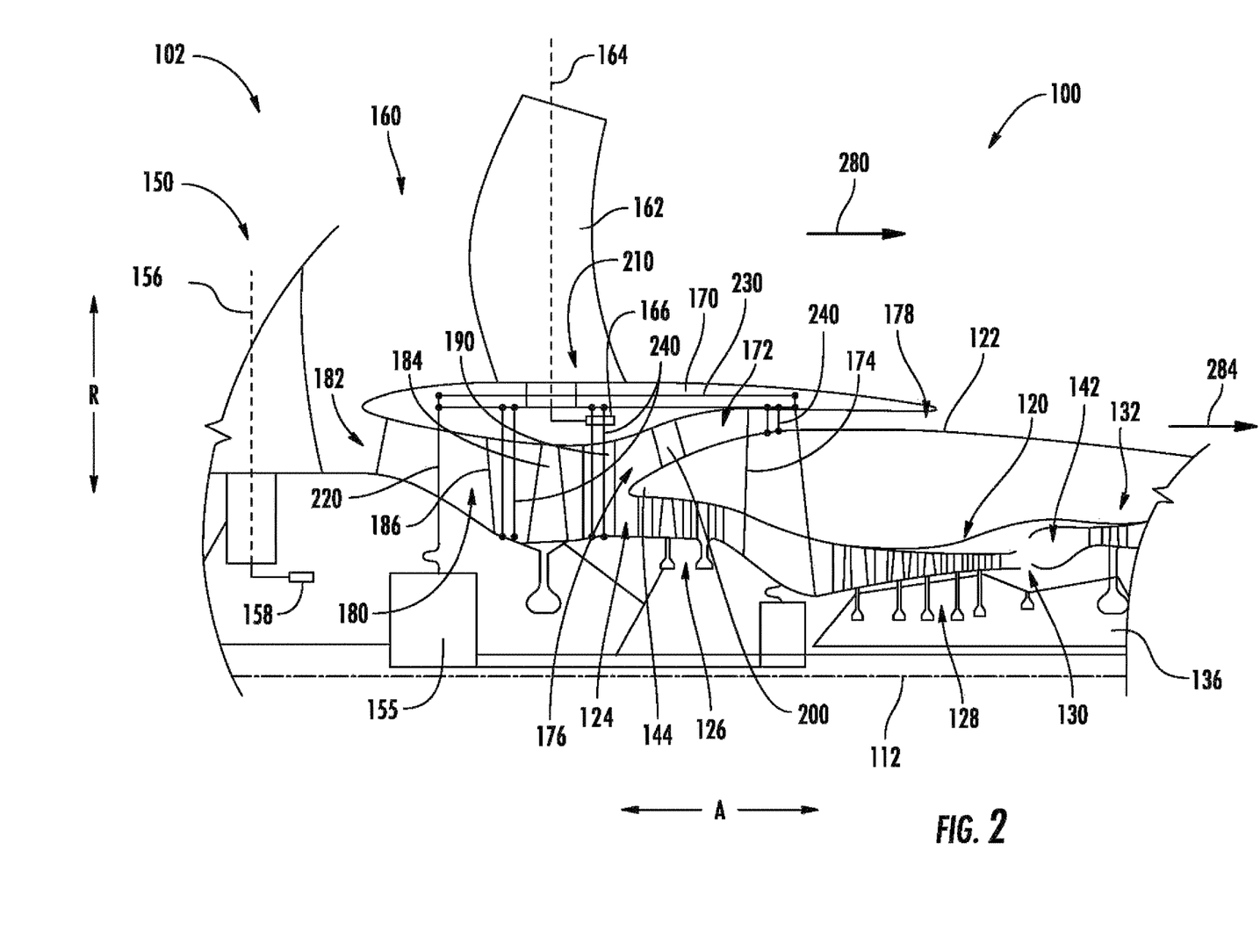
FIG. 2 is a close-up, schematic, cross-sectional view of a portion of the exemplary gas turbine engine of FIG. 1 including an exemplary heat transfer system according to an exemplary embodiment of the present subject matter.

Referring now to FIG. 2, a close-up, cross-sectional view of a heat transfer system 210 of the present disclosure that is coupled to, or integrated into, a portion of the exemplary engine 100 of FIG. 1 is provided.

In such an embodiment, the heat transfer system 210 is configured to reduce ice buildup or ice formation in a first engine component, e.g., the inlet guide vane 186, and a second engine component, e.g., the outlet guide vane 190.

The heat transfer system 210 is in thermal communication with a heat source. More specifically, for the embodiment depicted, the heat source is the gear box 155, and as such, the heat transfer system 210 is in communication with the gear box 155. In this manner, the heat transfer system 210 of the present disclosure utilizes waste heat from the gear box 155 to reduce ice buildup or ice formation in components of the engine 100.

It will be appreciated, however, that in other embodiments, the heat source may additionally or alternatively be a lubrication oil system of the engine 100, an electrical system of the engine 100, an airflow bleed of the engine 100, light energy, or any other suitable high temperature system of the engine 100.

In an exemplary embodiment, the heat transfer system 210 generally includes a gear box waste heat line 220, a first heat transfer component, and a second heat transfer component. For the embodiment depicted, the first heat transfer component is a horizontal heat transfer component 230, and the second heat transfer component is a vertical heat transfer component 240. As shown in the embodiment depicted, the heat transfer system 210 receives the waste heat from the gear box 155 via the gear box waste heat line 220.

As used herein, the term "horizontal heat transfer component" refers to a heat transfer component that extends substantially along a horizontal direction (e.g., parallel to the axial direction A), when the engine 100 is in a normal operational attitude (e.g., when a plane incorporating the engine 100 is parked, or the engine 100 is in a cruise operating condition). Similarly, the term "vertical heat transfer component" refers to a heat transfer component that extends substantially along a vertical direction (e.g., parallel to a vertical direction along the radial direction R), when the engine 100 is in a normal operational attitude (e.g., when a plane incorporating the engine 100 is parked, or the engine 100 is in a cruise operating condition).

In an exemplary embodiment, the horizontal heat transfer component 230 extends along the axial direction A with respect to the first engine component, e.g., the inlet guide vane 186, and the second engine component, e.g., the outlet guide vane 190. It is contemplated that the horizontal heat transfer component 230 includes a heat pipe that is configured to transfer the heat from the gear box 155 to the vertical heat transfer component 240. In such a manner, it will be appreciated that the horizontal heat transfer component 230 may generally include a hot interface and a cold interface, and may include a phase change material therein. At the hot interface, the phase change material in a liquid form is in thermal contact via the gear box waste heat line 220 with a thermally conductive surface of the heat source (e.g., the gear box 155 in the embodiment shown) and absorbs heat from that surface and turns into a vapor. The vapor then travels along the horizontal heat transfer component 230 to the cold interface and condenses back into a liquid, releasing latent heat of the phase change material. The liquid then returns to the hot interface through, e.g., a capillary action or gravity and the cycle repeats. Advantageously, heat pipes have a high thermal conductivity due to the effective heat transfer during phase change of the material within, e.g., a higher thermal conductivity than conventional copper rods. In other exemplary embodiments, it is contemplated that a heat pipe of a heat transfer system of the present disclosure may have other orientations, e.g., horizontal, vertical, or inclined depending on the location of the source and the sink.

Furthermore, in an exemplary embodiment, the vertical heat transfer component 240 extends in a vertical direction along the radial direction R, within each of the first engine component, e.g., the inlet guide vane 186, and the second engine component, e.g., the outlet guide vane 190. The vertical heat transfer component 240 is in communication with the gear box waste heat line 220 via the horizontal heat transfer component 230. It is contemplated that the vertical heat transfer component 240 includes a graphene rod or graphene layers that are configured to transfer the heat from the gear box 155 to the first engine component, e.g., the inlet guide vane 186, and the second engine component, e.g., the outlet guide vane 190. In this manner, the waste heat from the gear box 155 is utilized to reduce ice buildup or ice formation in the first engine component, e.g., the inlet guide vane 186, the second engine component, e.g., the outlet guide vane 190, and/or any other desired engine component, e.g., the stationary strut 174. Advantageously, graphene has unique physical properties suited for the heat transfer systems and anti-icing applications described herein. Graphene has a high electrical conductivity and a high thermal conductivity leading to minimal heat resistance. Graphene is flexible, thin, and transparent and makes for an effective coating that lowers the weight required. Also, graphene is stronger than steel, durable, and has reduced erosion. Graphene can be applied as a sheet layer, a coating, or as a part of an alloy. It is contemplated that graphene rods can be an alternative to heat pipes in configurations that have multiple bends, space constraints, or work against gravity.

Furthermore, graphene is flexible, impermeable to molecules, and highly electrically and thermally conductive. Additionally, graphene combines the strength and light weight properties of the carbon network allotropes.

Graphene has a melting temperature of about 5000 K (about 4727° C.) and has desired properties withstanding flame. The conductivity of graphene is anisotropic, and graphene can be used as an insulating material. Graphene also has desired impact resistance. Conventional ice resistance coatings that have a lower impact resistance are less desirable in aeronautical engines for these reasons.

Figure 3:
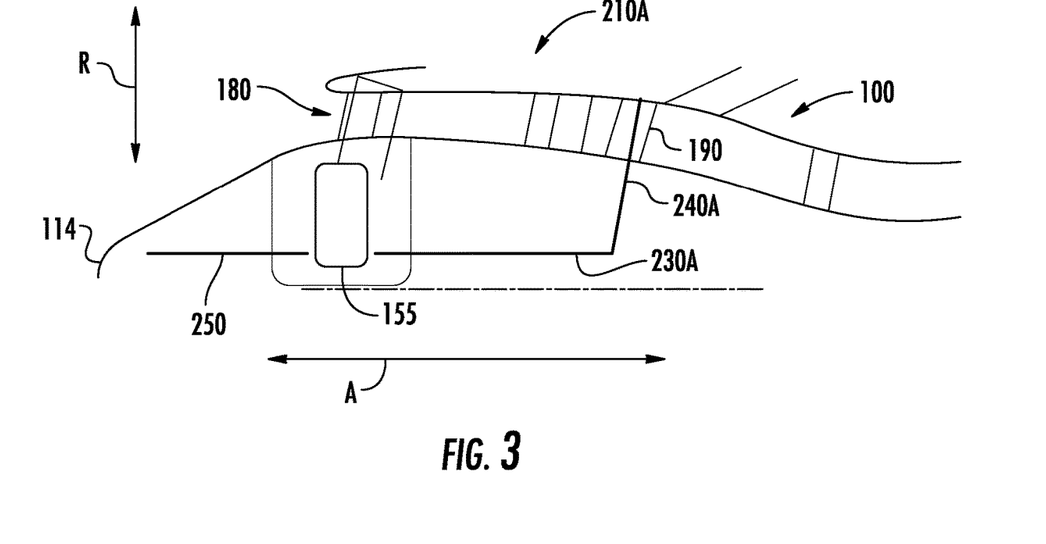
FIG. 3 is a close-up, schematic, cross-sectional view of a portion of an exemplary gas turbine engine including an exemplary heat transfer system according to another exemplary embodiment of the present subject matter.

Referring now to FIG. 3, a close-up, cross-sectional view of a heat transfer system 210A according to another exemplary embodiment of the present disclosure that is coupled to, or integrated into, a portion of the exemplary engine 100 of FIG. 1 is provided.

The exemplary heat transfer system 210A depicted in FIG. 3 may be configured in substantially the same manner as the exemplary heat transfer system 210 described above with reference to FIG. 2. The embodiment illustrated in FIG. 3 includes similar components to the embodiment illustrated in FIG. 2, and the similar components are denoted by a reference number followed by the letter A. For the sake of brevity, these similar components of heat transfer system 210A (FIG. 3) will not all be discussed in conjunction with the embodiment illustrated in FIG. 3.

In the exemplary embodiment depicted, the heat transfer system 210A further includes a second horizontal heat transfer component 250 that extends along the axial direction A from the gear box 155 towards the forward end 114 of the engine 100. In this manner, the heat transfer system 210A is configured to provide waste heat from the gear box 155 to reduce ice buildup or ice formation in components both forward and aft of the gear box 155 of the engine 100. For example, the second horizontal heat transfer component 250 extends forward of the gear box 155 and a horizontal heat transfer component 230A extends aft of the gear box 155.

Furthermore, in the exemplary embodiment depicted, the horizontal heat transfer component 230A may extend along the axial direction A between a first engine component and a second engine component at a location radially inward from the inlet duct 180. In the exemplary embodiment depicted in FIG. 2, the horizontal heat transfer component 230 extends along the axial direction A between a first engine component and a second engine component, e.g., the outlet guide vane 190, at a location radially outward from the inlet duct 180. A vertical heat transfer component 240A extends along the radial direction R from the horizontal heat transfer component 230A through the outlet guide vane 190. In other exemplary embodiments, it is contemplated that heat transfer systems of the present disclosure may include horizontal graphene rods connected to vertical heat pipes or vice versa.

Figure 4:
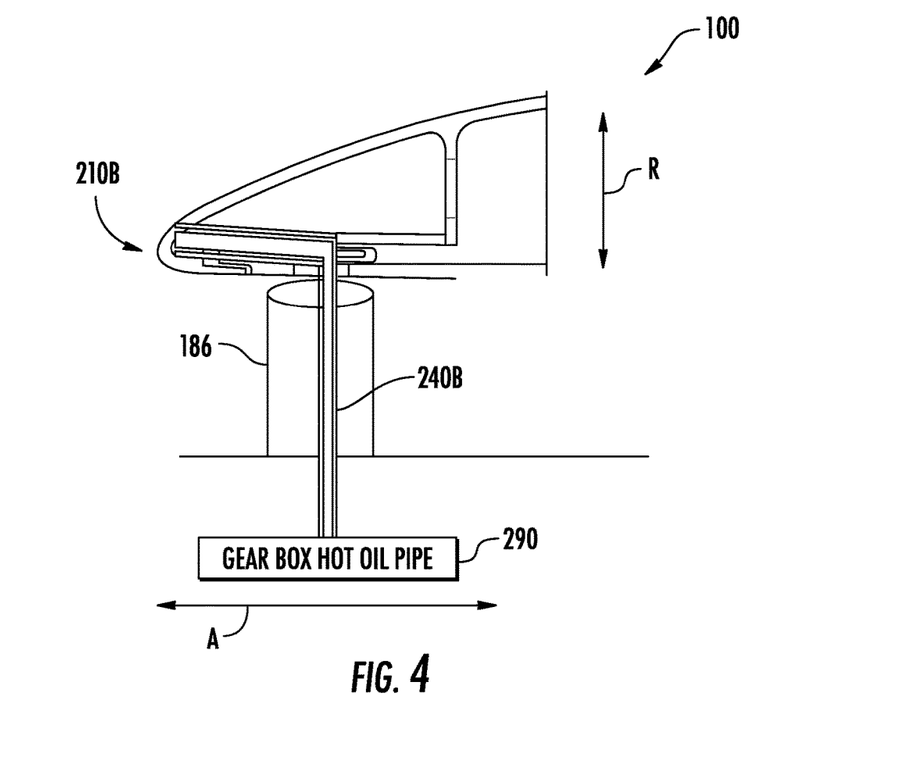
FIG. 4 is a close-up, schematic, cross-sectional view of a portion of an exemplary gas turbine engine including an exemplary heat transfer system according to another exemplary embodiment of the present subject matter.

Referring now to FIG. 4, a close-up, cross-sectional view of a heat transfer system 210B according to another exemplary embodiment of the present disclosure that is coupled to, or integrated into, a portion of the exemplary engine 100 of FIG. 1 is provided.

The exemplary heat transfer system 210B depicted in FIG. 4 may be configured in substantially the same manner as the exemplary heat transfer system 210 described above with reference to FIG. 2. The embodiment illustrated in FIG. 4 includes similar components to the embodiment illustrated in FIG. 2, and the similar components are denoted by a reference number followed by the letter B. For the sake of brevity, these similar components of heat transfer system 210B (FIG. 4) will not all be discussed in conjunction with the embodiment illustrated in FIG. 4.

In the exemplary embodiment depicted, the heat transfer system 210B utilizes a vertical heat transfer component 240B that extends along the radial direction R within a first engine component, e.g., the inlet guide vane 186, and is directly in thermal communication with a portion of the gear box, e.g., a gear box hot oil pipe 290. It is contemplated that the gear box hot oil pipe 290 contains lubrication oil from the gear box 155. Such a configuration enables anti-icing of both an inlet guide vane 186 and a splitter portion, e.g., splitter or leading edge 144 (FIGS. 1 and 2), circumferentially with relatively lesser quantities of oil.

Figure 5:
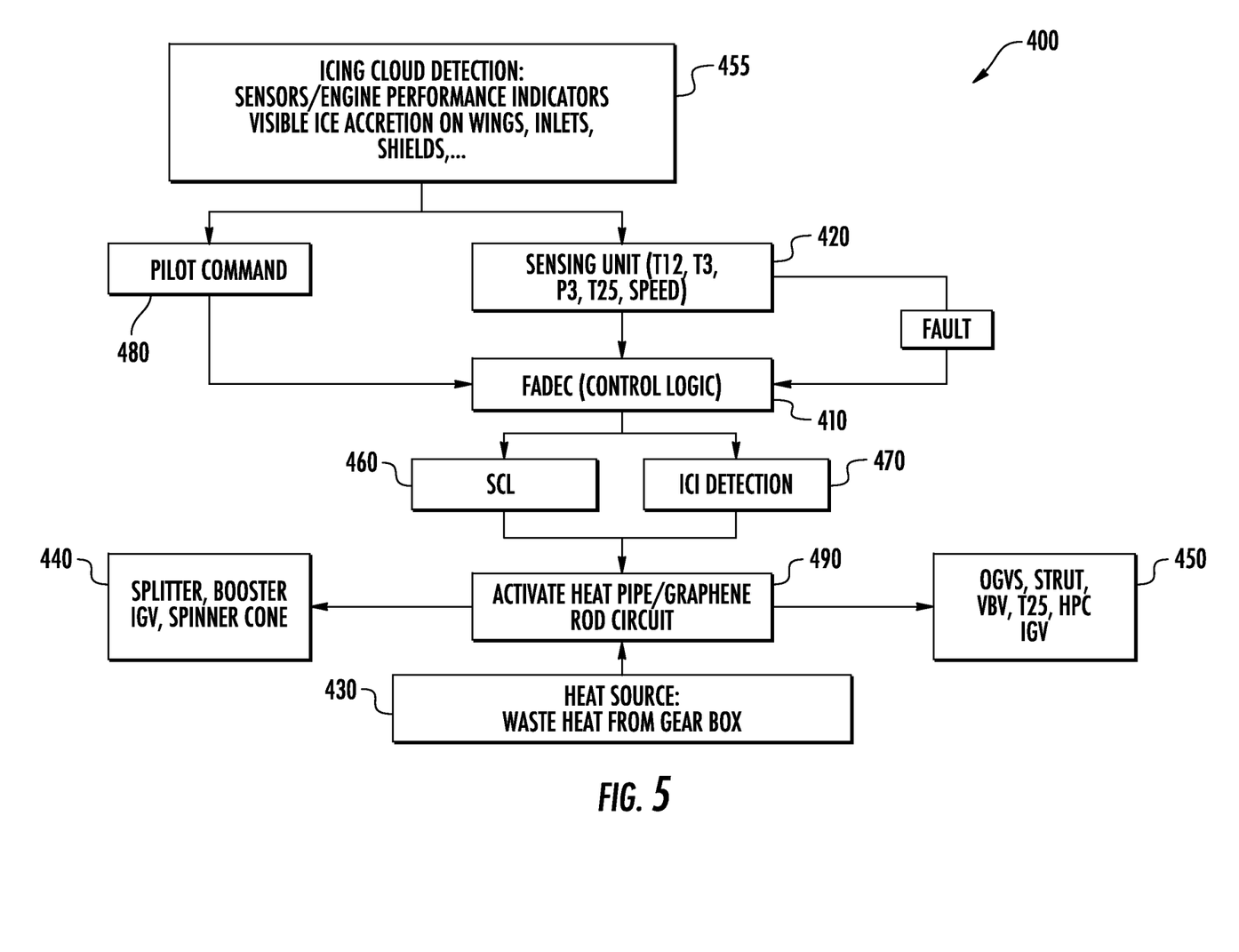
FIG. 5 provides a block diagram of a control system for controlling a gas turbine engine including a heat transfer system in accordance with exemplary embodiments of the present disclosure.

FIG. 5 provides a block diagram of an exemplary control system 400 for controlling the engine 100 (FIG. 1) and any of the heat transfer systems 210, 210A, 210B (FIGS. 2-4) in accordance with exemplary embodiments of the present disclosure.

Referring to FIG. 5, a control system 400 of the present disclosure may be in communication with the heat transfer system 210, 210A, 210B (FIGS. 2-4) of the engine 10. For example, the control system 400 may be used to determine when to activate the heat transfer system 210, 210A, 210B (FIGS. 2-4) of the present disclosure to provide the heat from the gear box 155 to a selected engine component via the heat transfer system 210, 210A, 210B (FIGS. 2-4).

In some embodiments, all of the components of the control system 400 are onboard the turbofan engine 10. In other embodiments, some of the components of the control system 400 are onboard the turbofan engine 100 and some are offboard the turbofan engine 100. For instance, some of the offboard components can be mounted to a wing, fuselage, or other suitable structure of an aerial vehicle to which the turbofan engine 100 is mounted.

Referring still to FIG. 5, the control system 400 includes a controller 410 and a sensing unit 420 (e.g., including temperature sensors, e.g., T12, T3, T25, or other temperature sensors, pressure sensors, e.g., P3 or other pressure sensors, and/or speed sensors), and is operable with an engine having a heat source 430 and a heat transfer system 210, 210A, 210B. In an exemplary embodiment, the control system 400 and the heat transfer system 210, 210A, 210B is in communication with a first group of engine components 440 and a second group of engine components 450. It is contemplated that the first engine component, e.g., the inlet guide vane 186 (FIG. 2), described above can be one or more of the first group of engine components 440 and that the second engine component, e.g., the outlet guide vane 190 (FIG. 2), described above can be one or more of the second group of engine components 450.

It is further contemplated that the first group of engine components 440 may include splitter components, booster inlet guide vanes, spinner cone components, and/or other similar engine components. Furthermore, it is contemplated that the second group of engine components 450 may include outlet guide vanes, strut components, temperature sensor components, high pressure compressor inlet guide vanes, variable bleed valve ("VBV") components, and/or other similar engine components.

In an exemplary embodiment, the sensing unit 420 may include sensors located at desired components of the engine 10. The sensing unit 420 of the control system 400 monitors conditions 455 of the components of the engine 100. Generally, when the sensing unit 420 receives an input indicating a change in a condition 455 of one of the components of the engine 100, the controller 410 may make a determination of one or more conditions indicative of an icing condition or a potential icing condition, and at activate heat pipe/graphene rod circuit control 490, activate a circuit of the heat transfer system 210 of the present disclosure to provide the heat from the heat source 430 to the detected component of the engine 100 via the heat transfer system 210. The circuit may be a heat pipe/graphene rod circuit control 490, and the heat transfer system 210 may include a plurality of circuits extending in thermal communication with a plurality of different locations, including the first group of engine components 440 and the second group of engine components 450.

It is contemplated that the conditions 455 of the components of the engine 100 that are monitored by the sensing unit 420 include temperature, pressure, and/or other information indicative of an icing condition and/or ice formation on a component of the engine 100.

Advantageously, the control system 400 of the present disclosure may monitor both a first type of detected information 460 and a second type of detected information 470. In this manner, in response to a type of received input indicating the change in the condition of a component of the engine 100, the control system 400 is configured to selectively provide the heat from the heat source 430 to either the first group of engine components 440 or the second group of engine components 450.

It is contemplated that the first type of detected information 460 includes supercooled liquid (SCL) information. For example, such information may include sensing some water droplets at a pre-determined lower temperature. Furthermore, the first type of detected information 460 may correspond to the first group of engine components 440. Supercooled liquid (SCL) information is that state of water droplets at below freezing temperatures that tend to form ice upon impinging on the aircraft/engine surfaces.

It is further contemplated that the second type of detected information 470 includes ice crystal ice (ICI) detection information through a flow path of the engine 100 and may include temperature information. Furthermore, the second type of detected information 470 may correspond to the second group of engine components 450. Ice crystal ice (ICI) information is the solid state of water droplets at high altitudes that tend to bounce, fragment, melt, and can stick to the aircraft/engine surfaces.

The first group of engine components 440 and the second group of engine components 450 are susceptible to icing at different conditions. Therefore, having a first type of detected information 460 for the first group of engine components 440 and a second type of detected information 470 for the second group of engine components 450 allows for proper icing monitoring and detection for each group of engine components. Furthermore, in this manner, the control system 400 is able to activate, e.g., at activate heat pipe/graphene rod circuit control 490, a circuit of the heat transfer system 210 only for the group of engine components that are experiencing a potential icing situation. For example, the activate heat pipe/graphene rod circuit control 490 of the present disclosure allows for selective activation of only a circuit to either the first group of engine components 440 or the second group of engine components 450. In this manner, the control system 400 is able to selectively activate and selectively provide the heat from the heat source 430 to only the detected component of the engine 100 via the heat transfer system 210. For example, in an exemplary embodiment, the activate heat pipe/graphene rod circuit control 490 includes a mechanical switch that is actuated by a Full Authority Digital Engine Control (FADEC) system to complete the circuit between source and sink to transfer the heat, e.g., a connector between a vertical heat transfer component 240B (FIG. 4) and a hot oil pipe 290 (FIG. 4).

Furthermore, the control system 400 includes a pilot command section 480. In exemplary embodiments, the pilot command section 480 is indicative of an operating condition at which the engine 100 (FIG. 2) is susceptible to ice buildup or ice formation.

In an exemplary embodiment, the engine 100 (FIG. 2) further includes a computing system. Particularly, for this embodiment, the engine 100 includes a computing system having one or more computing devices, including the controller 410 configured to control the engine 100, and in this embodiment, the heat source 430 and other components of the control system 400. The controller 410 can include one or more processor(s) and associated memory device(s) configured to perform a variety of computer-implemented functions and/or instructions (e.g., performing the methods, steps, calculations and the like and storing relevant data as disclosed herein). The instructions, when executed by the one or more processors, can cause the one or more processor(s) to perform operations, such as providing the heat from the gear box 155 to an engine component via the heat transfer system 210 upon receiving an input indicating a change in condition of one of the components of the engine 100.

Additionally, the controller 410 can include a communications module to facilitate communications between the controller 410 and various components of the aerial vehicle and other electrical components of the engine 100. The communications module can include a sensor interface (e.g., one or more analog-to-digital converters) to permit signals transmitted from the one or more sensors to be converted into signals that can be understood and processed by the one or more processor(s). It should be appreciated that the sensors can be communicatively coupled to the communications module using any suitable means. For example, the sensors can be coupled to the sensor interface via a wired connection. However, in other embodiments, the sensors can be coupled to the sensor interface via a wireless connection, such as by using any suitable wireless communications protocol. As such, the processor(s) can be configured to receive one or more signals or outputs from the sensors, such as one or more operating conditions/parameters.

Figure 6:
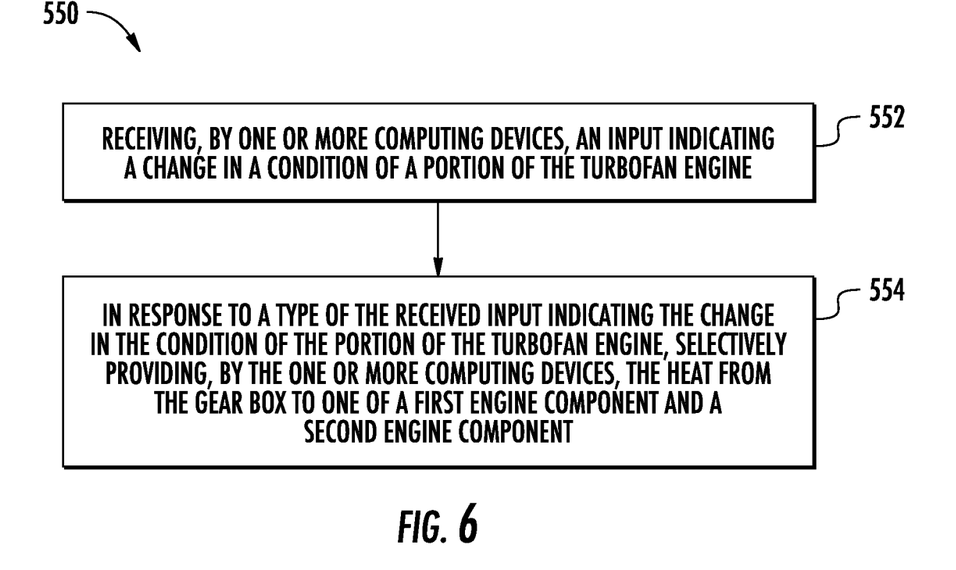
FIG. 6 is a flow diagram of an exemplary method of providing heat from a gear box of a turbofan engine to a first engine component and a second engine component of the turbofan engine to reduce ice buildup or ice formation in accordance with exemplary embodiments of the present disclosure.

As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors can also be configured to complete the required computations needed to execute advanced algorithms. Additionally, the memory device(s) can generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) can generally be configured to store suitable computer-readable instructions that, when implemented by the processor(s), configure the controllers 410 to perform the various functions described herein. The controller 410 can be configured in substantially the same manner as the exemplary computing device of the computing system 500 described below with reference to FIG. 7 (and may be configured to perform one or more of the functions of the exemplary method (550) described herein).

The controller 410 may be a system of controllers or a single controller. The controller 410 may be a controller dedicated to control of the heat source 430 and associated electrical components or can be an engine controller configured to control the engine 100 as well as the control system 400, and its associated electrical components. The controller 410 can be, for example, an Electronic Engine Controller (EEC) or an Electronic Control Unit (ECU) of a Full Authority Digital Engine Control (FADEC) system.

The control system 400 can include one or more power management electronics or electrical control devices, such as inverters, converters, rectifiers, devices operable to control the flow of electrical current, etc. For instance, one or more of the control devices can be operable to condition and/or convert electrical power (e.g., from AC to DC or vice versa). Further, one or more of the control devices can be operable to control the heat provided to an engine component by the heat source 430 via the heat transfer system 210. Although the control devices may be separate from the heat source 430 and the controller 410, it will be appreciated that one, some, or all of control devices can be located onboard the heat source 430 and/or the controller 410.

As discussed, the engine 100 may also include one or more sensors for sensing and/or monitoring various engine operating conditions and/or parameters during operation. The sensors of the sensing unit 420 can sense or measure various engine conditions, e.g., pressures and temperatures, and one or more signals may be routed from the one or more sensors to the controller 410 for processing. Accordingly, the controller 410 is communicatively coupled with the one or more sensors, e.g., via a suitable wired or wireless communication link. It will be appreciated that the engine 100 can include other sensors at other suitable stations along the core air flowpath.

In an exemplary embodiment, the one or more sensors of the sensing unit 420 may monitor a temperature of the engine 100 and the controller 410 may be configured to activate the heat source 430 once certain predetermined conditions of the components of the engine 100 have been reached. In exemplary embodiments, the one or more sensors of the sensing unit 420 may include temperature detectors.

FIG. 6 provides a flow diagram of an exemplary method (550) of providing heat from a gear box 155 of an engine 100 to a first engine component and a second engine component of the engine 100 to reduce ice buildup or ice formation in accordance with exemplary embodiments of the present disclosure. For instance, the exemplary method (550) may be utilized for operating the engine 100 described herein. It should be appreciated that the method (550) is discussed herein only to describe exemplary aspects of the present subject matter and is not intended to be limiting.

At (552), the method (550) includes receiving, by one or more computing devices, an input indicating a change in a condition of a portion of the turbofan engine 100. For instance, the controller 410 can receive the input in response to when a condition, e.g., a temperature or a pressure, of a component of the engine 100 is reached.

At (554), in response to a type of the received input indicating the change in the condition of the portion of the engine 100, the method (550) includes selectively providing, by the one or more computing devices, the heat from the gear box 155 to one of the first engine component and the second engine component.

Figure 7:
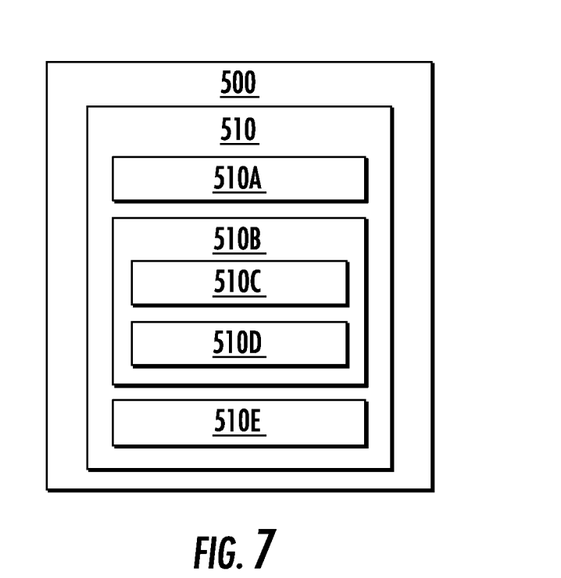
FIG. 7 is an example computing system according to example embodiments of the present disclosure.

FIG. 7 provides an example computing system 500 according to example embodiments of the present disclosure. The computing systems (e.g., the controller 410) described herein may include various components and perform various functions of the computing system 500 described below, for example.

As shown in FIG. 7, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, operations for electrically assisting a turbomachine during transient operation (e.g., method (550) of FIG. 6), and/or any other operations or functions of the one or more computing device(s) 510. Accordingly, the method (550)

may be a computer-implemented method, such that each of the steps of the exemplary method (550) are performed by one or more computing devices, such as the exemplary computing device 510 of the computing system 500. The instructions 510C can be software written in any suitable programming language or can be implemented in hardware. Additionally, and/or alternatively, the instructions 510C can be executed in logically and/or virtually separate threads on the one or more processor(s) 510A. The one or more memory device(s) 510B can further store data 510D that can be accessed by the one or more processor(s) 510A. For example, the data 510D can include models, databases, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as electrical control device(s), can be configured to receive one or more commands from the computing device(s) 510 or provide one or more commands to the computing device(s) 510.

The control system 400 of the present disclosure does not require a change to the mechanical hardware of an engine and facilities simple retrofit with existing engines.

It is contemplated that the turbomachines and methods of the present disclosure may be implemented on an aircraft, helicopter, automobile, boat, submarine, train, unmanned aerial vehicle or drone and/or on any other suitable vehicle. While the present disclosure is described herein with reference to an aircraft implementation, this is intended only to serve as an example and not to be limiting. One of ordinary skill in the art would understand that the turbomachines and methods of the present disclosure may be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

Further aspects of the disclosure are provided by the subject matter of the following clauses:

A turbofan engine defining an axial direction and a radial direction, the turbofan engine comprising: a fan; a turbomachine operably coupled to the fan for driving the fan, wherein the turbomachine, the fan, or both include an engine component; a heat source; and a heat transfer system configured to reduce ice buildup or ice formation in the engine component, the heat transfer system in communication with the heat source, the heat transfer system comprising: a first heat transfer component in communication with the heat source; and a second heat transfer component that extends from the first heat transfer component to or through the engine component, wherein the first heat transfer component comprises one of a heat pipe or a graphene rod, and wherein the second heat transfer component comprises the other of the heat pipe or the graphene rod.

The turbofan engine of any preceding clause, wherein the first heat transfer component is a horizontal heat transfer component, and wherein the second heat transfer component is a vertical heat transfer component.

The turbofan engine of any preceding clause, wherein the horizontal heat transfer component comprises the heat pipe configured to transfer the heat from the heat source to the vertical heat transfer component.

The turbofan engine of any preceding clause, wherein the vertical heat transfer component comprises the graphene rod configured to transfer the heat to the engine component.

The turbofan engine of any preceding clause, wherein the heat source is a gear box, and wherein the turbomachine is operably coupled to the fan through the gear box.

The turbofan engine of any preceding clause, wherein the engine component is a first engine component, wherein the turbomachine, the fan, or both further include a second engine component, and wherein the heat transfer system is configured to selectively transfer heat from the gear box to the first engine component and to the second engine component.

The turbofan engine of any preceding clause, further comprising a controller having one or more processors and one or more memory devices, the one or more memory devices storing instructions that when executed by the one or more processors cause the one or more processors to perform operations, in performing the operations, the one or more processors are configured to: receive a first input indicating a first change in a condition of a first portion of the turbofan engine; and in response to the first input, provide the heat from the heat source to the first engine component via the heat transfer system.

The turbofan engine of any preceding clause, wherein the one or more processors are further configured to: receive a second input indicating a second change in a condition of a second portion of the turbofan engine; and in response to the second input, provide the heat from the heat source to the second engine component via the heat transfer system.

The turbofan engine of any preceding clause, wherein the first engine component is one of a splitter component, a booster inlet guide vane component, and a spinner cone component.

The turbofan engine of any preceding clause, wherein the second engine component is one of an outlet guide vane component, a strut component, and a compressor inlet guide vane component.

The turbofan engine of any preceding clause, wherein the fan is an unducted fan.

A heat transfer system for a turbofan engine defining an axial direction and a radial direction, the turbofan engine comprising a fan, a turbomachine operably coupled to the fan for driving the fan, wherein the turbomachine, the fan, or both include an engine component, and a heat source, the heat transfer system configured to reduce ice buildup or ice formation in the engine component, the heat transfer system in communication with the heat source, the heat transfer system comprising: a first heat transfer component in communication with the heat source; and a second heat transfer component that extends from the first heat transfer component to or through the engine component, wherein the first heat transfer component comprises one of a heat pipe or a graphene rod, and wherein the second heat transfer component comprises the other of the heat pipe or the graphene rod.

The heat transfer system of any preceding clause, wherein the first heat transfer component is a horizontal heat transfer component, and wherein the second heat transfer component is a vertical heat transfer component.

The heat transfer system of any preceding clause, wherein the horizontal heat transfer component comprises the heat pipe configured to transfer the heat from the heat source to the vertical heat transfer component, and wherein the vertical heat transfer component comprises the graphene rod configured to transfer the heat to the first engine component and the second engine component.

The heat transfer system of any preceding clause, wherein the heat source is a gear box, and wherein the turbomachine is operably coupled to the fan through the gear box.

The heat transfer system of any preceding clause, wherein the engine component is a first engine component, wherein the turbomachine, the fan, or both further include a second engine component, and wherein the heat transfer system is configured to selectively transfer heat from the gear box to the first engine component and to the second engine component.

A method of providing heat from a gear box of a turbofan engine to a first engine component and a second engine component of the turbofan engine to reduce ice buildup or ice formation, the turbofan engine defining an axial direction and a radial direction and comprising a fan and a turbomachine operably coupled to the fan for driving the fan, the method comprising: receiving, by one or more computing devices, an input indicating a change in a condition of a portion of the turbofan engine; and in response to a type of the received input indicating the change in the condition of the portion of the turbofan engine, selectively providing, by the one or more computing devices, the heat from the gear box to one of the first engine component and the second engine component.

The method of any preceding clause, further comprising: receiving, by the one or more computing devices, a first input indicating a first change in a condition of a first portion of the turbofan engine; and in response to the received first input indicating the first change in the condition of the first portion of the turbofan engine, providing, by the one or more computing devices, the heat from the gear box to the first engine component.

The method of any preceding clause, further comprising: receiving, by the one or more computing devices, a second input indicating a second change in a condition of a second portion of the turbofan engine; and in response to the received second input indicating the second change in the condition of the second portion of the turbofan engine, providing, by the one or more computing devices, the heat from the gear box to the second engine component.

The method of any preceding clause, wherein selectively providing, by the one or more computing devices, the heat from the gear box to one of the first engine component and the second engine component comprises providing the heat along the axial direction to the one of the first engine component and the second engine component and providing the heat along the radial direction within the one of the first engine component and the second engine component.

The turbofan engine of any preceding clause, wherein a second horizontal heat transfer component extends forward of a gear box and a horizontal heat transfer component extends aft of the gear box.

The turbofan engine of any preceding clause, wherein the horizontal heat transfer component extends along the axial direction between a first engine component and a second engine component at a location radially inward from an inlet duct.

The turbofan engine of any preceding clause, wherein the horizontal heat transfer component extends along the axial direction between a first engine component and a second engine component at a location radially outward from an inlet duct.

The turbofan engine of any preceding clause, wherein the heat transfer system includes a vertical heat transfer component that extends along the radial direction within an inlet guide vane and is directly in thermal communication with a portion of a gear box hot oil pipe.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A turbofan engine defining an axial direction and a radial direction, the turbofan engine comprising:
   a fan;
   a turbomachine operably coupled to the fan for driving the fan, wherein the turbomachine, the fan, or both include an engine component;
   a heat source; and
   a heat transfer system configured to reduce ice buildup or ice formation in the engine component, the heat transfer system in communication with the heat source, the heat transfer system comprising:
     a first heat transfer component having a hot interface and a cold interface, wherein the hot interface is in thermal communication with the heat source; and
     a second heat transfer component that extends from the first heat transfer component to or through the engine component, wherein the first heat transfer component comprises one of a heat pipe or a graphene rod, and wherein the second heat transfer component comprises the other of the heat pipe or the graphene rod, wherein the first heat transfer component and the second heat transfer component are fluidly coupled together and configured to recirculate a phase change material therethrough, wherein the phase change material is in an at least partial vapor phase at the hot interface and condenses into a liquid phase at the cold interface, wherein the phase change material releases latent heat of the phase change material to heat the engine component.

2. The turbofan engine of claim 1, wherein the first heat transfer component is a horizontal heat transfer component, and wherein the second heat transfer component is a vertical heat transfer component.

3. The turbofan engine of claim 2, wherein the horizontal heat transfer component comprises the heat pipe configured to transfer the heat from the heat source to the vertical heat transfer component.

4. The turbofan engine of claim 2, wherein the vertical heat transfer component comprises the graphene rod configured to transfer the heat to the engine component.

5. The turbofan engine of claim 1, wherein the heat source is a gear box, and wherein the turbomachine is operably coupled to the fan through the gear box.

6. The turbofan engine of claim 5, wherein the engine component is a first engine component, wherein the turbomachine, the fan, or both further include a second engine component, and wherein the heat transfer system is configured to selectively transfer heat from the gear box to the first engine component and to the second engine component.

7. The turbofan engine of claim 6, further comprising a controller having one or more processors and one or more memory devices, the one or more memory devices storing instructions that when executed by the one or more processors cause the one or more processors to perform operations, in performing the operations, the one or more processors are configured to:
receive a first input indicating a first change in a condition of a first portion of the turbofan engine; and
in response to the first input, provide the heat from the heat source to the first engine component via the heat transfer system.

8. The turbofan engine of claim 7, wherein the one or more processors are further configured to:
receive a second input indicating a second change in a condition of a second portion of the turbofan engine; and
in response to the second input, provide the heat from the heat source to the second engine component via the heat transfer system.

9. The turbofan engine of claim 6, wherein the first engine component is one of a splitter component, a booster inlet guide vane component, and a spinner cone component.

10. The turbofan engine of claim 9, wherein the second engine component is one of an outlet guide vane component, a strut component, and a compressor inlet guide vane component.

11. The turbofan engine of claim 1, wherein the fan is an unducted fan.

12. A heat transfer system for a turbofan engine defining an axial direction and a radial direction, the turbofan engine comprising a fan, a turbomachine operably coupled to the fan for driving the fan, wherein the turbomachine, the fan, or both include an engine component, and a heat source, the heat transfer system configured to reduce ice buildup or ice formation in the engine component, the heat transfer system in communication with the heat source, the heat transfer system comprising:
a first heat transfer component having a hot interface and a cold interface, wherein the hot interface is in thermal communication with the heat source; and
a second heat transfer component that extends from the first heat transfer component to or through the engine component, wherein the first heat transfer component comprises one of a heat pipe or a graphene rod, and wherein the second heat transfer component comprises the other of the heat pipe or the graphene rod, wherein the first heat transfer component and the second heat transfer component are fluidly coupled together and configured to recirculate a phase change material therethrough, wherein the phase change material is in an at least partial vapor phase at the hot interface and condenses into a liquid phase at the cold interface, wherein the phase change material releases latent heat of the phase change material to heat the engine component.

13. The heat transfer system of claim 12, wherein the first heat transfer component is a horizontal heat transfer component, and wherein the second heat transfer component is a vertical heat transfer component.

14. The heat transfer system of claim 13, wherein the horizontal heat transfer component comprises the heat pipe configured to transfer the heat from the heat source to the vertical heat transfer component, and wherein the vertical heat transfer component comprises the graphene rod configured to transfer the heat to the first engine component and the second engine component.

15. The heat transfer system of claim 12, wherein the heat source is a gear box, and wherein the turbomachine is operably coupled to the fan through the gear box.

16. The heat transfer system of claim 15, wherein the engine component is a first engine component, wherein the turbomachine, the fan, or both further include a second engine component, and wherein the heat transfer system is configured to selectively transfer heat from the gear box to the first engine component and to the second engine component.

17. A method of providing heat from a gear box of a turbofan engine to a first engine component and a second engine component of the turbofan engine to reduce ice buildup or ice formation, the turbofan engine defining an axial direction and a radial direction and comprising a fan and a turbomachine operably coupled to the fan for driving the fan, the method comprising:
receiving, by one or more computing devices, an input indicating a change in a condition of a portion of the turbofan engine; and
in response to a type of the received input indicating the change in the condition of the portion of the turbofan engine, selectively providing, by the one or more computing devices, the heat from the gear box to one of the first engine component and the second engine component, wherein selectively providing, by the one or more computing devices, the heat from the gear box to one of the first engine component and the second engine component comprises:
recirculating a phase change material through a first heat transfer component and second heat transfer component fluidly coupled together in a closed loop, the first heat transfer component having a hot interface in thermal communication with the gear box and a cold interface in thermal communication with the one of the first engine component and the second engine component, wherein the hot interface is in thermal communication with the gearbox, wherein the first heat transfer component comprises one of a heat pipe or a graphene rod, and wherein the second heat transfer component comprises the other of the heat pipe or the graphene rod, and wherein the phase change material is in an at least partial vapor phase at the hot interface and condenses into a liquid phase at the cold interface, wherein the phase change material releases latent heat of the phase change material to heat the engine component.

18. The method of claim 17, further comprising:
- receiving, by the one or more computing devices, a first input indicating a first change in a condition of a first portion of the turbofan engine; and
- in response to the received first input indicating the first change in the condition of the first portion of the turbofan engine, providing, by the one or more computing devices, the heat from the gear box to the first engine component.

19. The method of claim 18, further comprising:
- receiving, by the one or more computing devices, a second input indicating a second change in a condition of a second portion of the turbofan engine; and
- in response to the received second input indicating the second change in the condition of the second portion of the turbofan engine, providing, by the one or more computing devices, the heat from the gear box to the second engine component.

20. The method of claim 17, wherein selectively providing, by the one or more computing devices, the heat from the gear box to one of the first engine component and the second engine component comprises providing the heat along the axial direction to the one of the first engine component and the second engine component and providing the heat along the radial direction within the one of the first engine component and the second engine component.

* * * * *